United States Patent
Hu et al.

(10) Patent No.: US 8,775,132 B2
(45) Date of Patent: Jul. 8, 2014

(54) SELECTING METHOD OF LIGHT GUIDE PLATE OF BACKLIGHT MODULE

(75) Inventors: Chechang Hu, Shenzhen (CN); Kuangyao Chang, Shenzhen (CN); Lei Sun, Shenzhen (CN); Wei Fan, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 365 days.

(21) Appl. No.: 13/380,889

(22) PCT Filed: Dec. 15, 2011

(86) PCT No.: PCT/CN2011/084085
§ 371 (c)(1),
(2), (4) Date: Dec. 26, 2011

(87) PCT Pub. No.: WO2013/086726
PCT Pub. Date: Jun. 20, 2013

(65) Prior Publication Data
US 2013/0158956 A1    Jun. 20, 2013

(30) Foreign Application Priority Data
Dec. 14, 2011   (CN) .......................... 2011 1 0418048

(51) Int. Cl.
*G06F 17/50* (2006.01)
(52) U.S. Cl.
USPC .......................................................... 703/1
(58) Field of Classification Search
USPC .......................................................... 703/1
See application file for complete search history.

(56) References Cited

U.S. PATENT DOCUMENTS

| | | | |
|---|---|---|---|
| 6,704,070 B2* | 3/2004 | Taniguchi et al. | 349/65 |
| 8,184,113 B2* | 5/2012 | Huang | 345/212 |
| 8,573,826 B2* | 11/2013 | Chang et al. | 362/609 |
| 2005/0007364 A1* | 1/2005 | Oyama et al. | 345/428 |
| 2009/0024362 A1* | 1/2009 | Linzie | 703/1 |
| 2009/0028423 A1* | 1/2009 | Sandstrom et al. | 382/149 |
| 2011/0046922 A1* | 2/2011 | Zhang et al. | 703/1 |
| 2012/0262507 A1* | 10/2012 | Ide et al. | 345/694 |

OTHER PUBLICATIONS

Zhang He, Zhu Jun, Li Qunqing, Tan Qiaofeng, "Design of Light Guide Plate using White Light Emitting Diode for Direct Illumination of Liquid Crystal Display" IEEE 2010, 978-1-4244-4964-4, 4 pages.*
Jee-Gong Chang, Yu-Bin Fang, "Dot-pattern design of a light guide in an edge-lit backlight using a regional partition approach", Optical Engineering 46(4), 043002, (Apr. 2007), pp. 1-9.*

\* cited by examiner

*Primary Examiner* — Dwin M Craig

(57) ABSTRACT

A selecting method of light guide plate of backlight module is described. The selecting method includes the steps of: calculating a plurality of mura indexes (MI) corresponding to a plurality of mura statuses of a plurality of first light guide plate (LGP) types, respectively; defining a plurality of film structures, wherein each of the film structures corresponds to each of mura indexes for mapping the mura indexes (MI) of the first LGP types with the film structures to construct a mapping database; and selecting one of the film structures and one of the mura indexes (MI) correspondingly from the mapping database for determining a critical dot dimension (CDD) of a second LGP type of the selected film structure. The selecting method avoids the mura, speed up the research and development procedure of the backlight module, labor cost and manufacturing cost when the LGP is assembled with the film structure.

7 Claims, 5 Drawing Sheets

SELECTING METHOD OF LIGHT GUIDE PLATE OF BACKLIGHT MODULE

FIELD OF THE INVENTION

The present invention relates to a selecting method, and more particularly to a selecting method of light guide plate of backlight module applicable to the manufacturing procedure of backlight module of a liquid crystal display (LCD).

BACKGROUND OF THE INVENTION

With the wide use of the LCD panel, LCD manufacturing is one of most popular industries. For an example of thin film transistor (TFT) LCD, i.e. a non-emission display, it is necessary to assemble the TFT LCD with a backlight module served as a light source besides an LCD panel for controlling the display screen. Conventionally, the backlight module includes a direct-type lighting module and an edge-type lighting module wherein the edge-type lighting module is widely utilized.

Based on the design requirement of the backlight module in the LCD, a variety of standards with different brightness and color chromaticity are adopted. However, the efficiency of LCD has to be considerably increased to meet tightly high requirement. Thus, the brightness, the amount or lighting power of LED, of the light source cannot be invariably enlarged to enhance the illumination of the backlight module. The film structures of the backlight module may be arranged to adjust the brightness of the backlight module.

After the film structures with different brightness gains are selected, the brightness and chromaticity of the backlight module may be adjusted though. However, the light convergence, the transmittance rate and the material of the film structures may be changed according to different film structures. Even if the film structures are different, however, their transmittance rates are the same so that the light guide plate under the film structure easily results in pattern mura effect. That is, after the brightness gain of the film structure is generated, the pattern mura effect occurs since the LGP assembled with the film structure is changed. The parameters of the film structure can be generated by try and error method to from the film structure for the identification of pattern mura. However, this manner will spend a lot of labor power and manufacturing cost, which results in the delay of the producing procedure.

Consequently, there is a need to develop a novel selecting method of LGP to solve the aforementioned problems of labor cost and manufacturing cost while producing the backlight module.

SUMMARY OF THE INVENTION

One objective of the present invention is to provide a selecting method of a light guide plate (LGP) used in a backlight module of a liquid crystal display (LCD) panel. The selecting method avoids the mura, speed up the research and development procedure of the backlight module, labor cost and manufacturing cost when the LGP is assembled with the film structure.

According to the above objective, the present invention sets forth a selecting method including the steps of:

calculating a plurality of mura indexes (MI) corresponding to a plurality of mura statuses of a plurality of first LGP types, respectively, wherein each of the first LGP types has a plurality of first dot patterns and each of the mura indexes is represented by an equation, $MI=D1*T1/(P1*P1)$, and wherein MI represents each of the mura indexes, D1 represents a dimension of each of the first dot patterns, P1 represents a first interval distance between the first dot patterns and T1 represents a first thickness of each of the first LGP types;

defining a plurality of film structures, wherein each of the film structures corresponds to each of mura indexes for mapping the mura indexes (MI) of the first LGP types with the film structures correspondingly to construct a mapping database; and selecting one of the film structures and one of the mura indexes (MI) correspondingly from the mapping database for determining a critical dot dimension (CDD) of a second LGP type of the selected film structure, wherein the second LGP type comprises a plurality of second dot patterns, the critical dot dimension is positively related to the mura index of the selected film structure, the critical dot dimension is positively related to a second interval distance formed between the second dot patterns, and the critical dot dimension is inversely related to a second thickness of the second LGP type, for selecting the critical dot dimension based on the mura index of the selected film structure, the second interval distance and the second thickness of the selected film structure.

In one embodiment of the selecting method, the critical dot dimension (CDD) is represented by an equation, $CDD=MI*(P2*P2)/T2$, and wherein MI represents the selected mura index, P2 represents the second interval distance between the second dot patterns and T2 represents the second thickness of the second LGP type.

In one embodiment of the selecting method, when the selected film structure is composed of two overlapped diffusion plates, the mura index of the selected film structure is determined by a range from 0.44 to 0.66 and the CCD of the second LGP type is determined by a range from $0.44*(P2*P2)/T2$ to $0.66*(P2*P2)/T2$.

In one embodiment of the selecting method, when the selected film structure is composed of a diffusion plate, a brightness enhancement film (BEF) and a micro-lens which are sequentially overlapped, the mura index of the selected film structure is determined by a range from 0.57 to 0.85 and the CCD of the second LGP type is determined by a range from $0.57*(P2*P2)/T2$ to $0.85*(P2*P2)/T2$, and wherein the diffusion plate is adjacent to the first LGP type and the second LGP type.

In one embodiment of the selecting method, when the selected film structure is composed of a first diffusion plate, a brightness enhancement film (BEF) and a second diffusion plate which are sequentially overlapped, the mura index of the selected film structure is determined by a range from 0.71 to 1.07 and the CCD of the second LGP type is determined by a range from $0.71*(P2*P2)/T2$ to $1.07*(P2*P2)/T2$, and wherein the first diffusion plate is adjacent to the first LGP type and the second LGP type.

In one embodiment of the selecting method, when the selected film structure is composed of a diffusion plate, a brightness enhancement film (BEF) and a reflective brightness enhancement film which are sequentially overlapped, the mura index of the selected film structure is determined by a range from 0.68 to 1.02 and the CCD of the second LGP type is determined by a range from $0.68*(P2*P2)/T2$ to $1.02*(P2*P2)/T2$, and wherein the diffusion plate is adjacent to the first LGP type and the second LGP type.

In one embodiment of the selecting method, when the selected film structure is composed of a first brightness enhancement film, a second brightness enhancement film and a diffusion plate which are sequentially overlapped, the mura index of the selected film structure is determined by a range from 0.66 to 0.99 and the CCD of the second LGP type is determined by a range from 0.66*(P2*P2)/T2 to 0.99*(P2*P2)/T2, and wherein the first brightness enhancement film is adjacent to the first LGP type and the second LGP type.

The selecting method of a light guide plate (LGP) used in a backlight module of a liquid crystal display (LCD) panel avoids the mura, speed up the research and development procedure of the backlight module, labor cost and manufacturing cost when the LGP is assembled with the film structure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
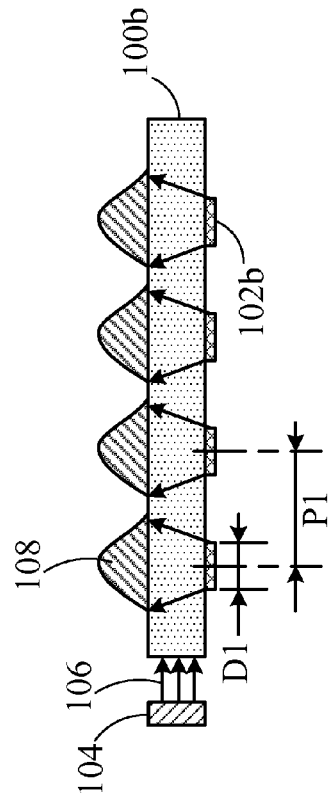
FIGS. 1A and 1B are schematic relationship views of dot pattern dimension and mura index (MI) on the light guide plate (LGP) according to embodiments of the present invention.
Figure 1B:
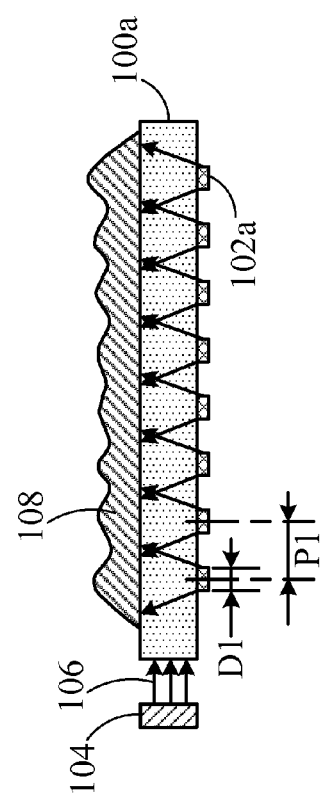

FIGS. 1A and 1B are schematic relationship views of dot pattern 102a, 102b dimension and mura index (MI) therebetween on the light guide plates (LGPS) 100a, 100b according to embodiments of the present invention. In FIG. 1A, the light source 104, e.g. light-emitted diode (LED), emits the light beam 106 to the first dot pattern 102a disposed under the first LGP 100a. The light beam 106 is reflected by the first dot pattern 102a and emits through the upper surface of the first LGP 100a. Since the geometric shapes and distribution statuses of first dot pattern 102a are differently arranged, a region distribution 108 with brightness intensity variation is formed on the upper surface of the first LGP 100a. In FIG. 1B, the light source 104, e.g. light-emitted diode (LED), emits the light beam 106 to the second dot pattern 102b disposed under the first LGP 100a. The light beam 106 is reflected by the second dot pattern 102b and emits through the upper surface of the second LGP 100b. Since the geometric shapes and distribution statuses of second dot pattern 102b are differently arranged, a region distribution 108 with brightness intensity variation is formed on the upper surface of the second LGP 100b. The dimension, e.g. diameter, of each second dot pattern 102b is greater than the dimension, e.g. diameter, of each first dot pattern 102a. The brightness intensity variation on the region distribution 108 in the above-mentioned descriptions is termed as pattern mura. When the total area of the first dot patterns 102a is equal to the total area of the second dot patterns 102b, the second LGP 100b composed of second dot patterns 102b with greater size easily results in pattern mura in comparison with the first LGP 100b composed of first dot patterns 102a with smaller size.

Figure 1C:
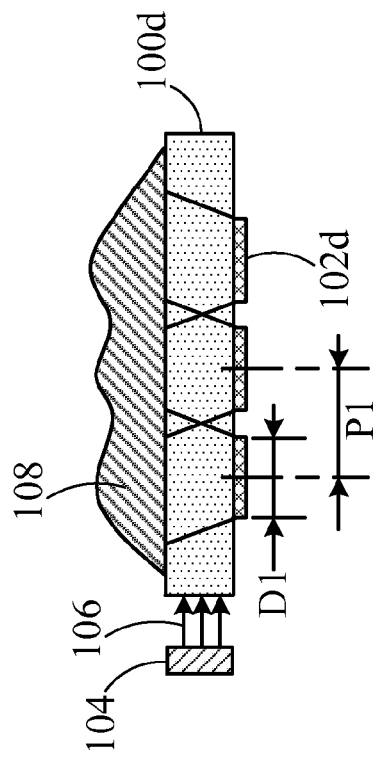
FIGS. 1C and 1D are schematic relationship views of dot pattern area and mura index (MI) on the LGP according to embodiments of the present invention.
Figure 1D:
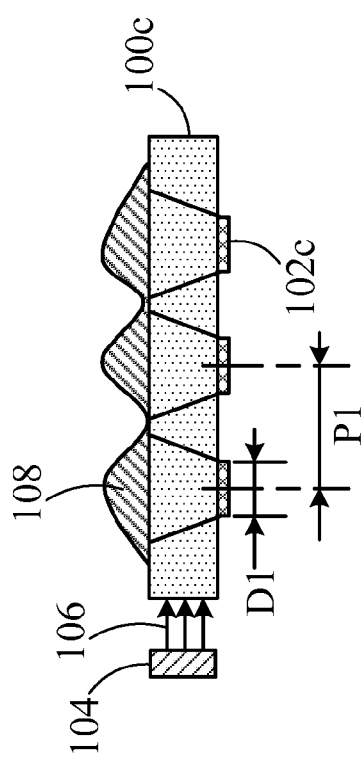

FIGS. 1C and 1D are schematic relationship views of dot pattern 102c, 102d area and mura index (MI) on the LGPS 100c, 100d according to embodiments of the present invention. In FIG. 1C, the light source 104, e.g. light-emitted diode (LED), emits the light beam 106 to the third dot pattern 102c disposed under the third LGP 100c. The light beam 106 is reflected by the third dot pattern 102c and emits through the upper surface of the third LGP 100c. Since the geometric shapes and distribution statuses of third dot pattern 102c are differently arranged, a region distribution 108 with brightness intensity variation is formed on the upper surface of the third LGP 100c. In FIG. 1D, the light source 104, e.g. light-emitted diode (LED), emits the light beam 106 to the fourth dot pattern 102d disposed under the fourth LGP 100d. The light beam 106 is reflected by the fourth dot pattern 102d and emits through the upper surface of the fourth LGP 100d. Since the geometric shapes and distribution statuses of fourth dot pattern 102d are differently arranged, a region distribution 108 with brightness intensity variation is formed on the upper surface of the fourth LGP 100d. When the total area of the third dot patterns 102c is less than to the total area of the fourth dot patterns 102d, the third LGP 100c composed of third dot patterns 102c with smaller total area easily results in pattern mura in comparison with the fourth LGP 100d composed of fourth dot patterns 102d with greater total area.

Figure 1F:
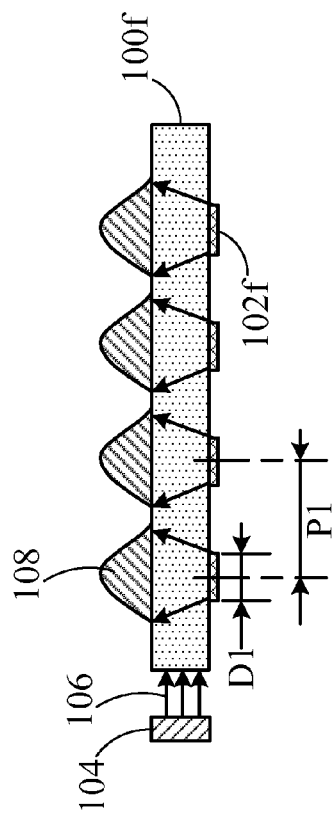
FIGS. 1E and 1F are schematic relationship views of the LGP thickness and mura index (MI) on the light guide plate (LGP) according to embodiments of the present invention.
Figure 1E:
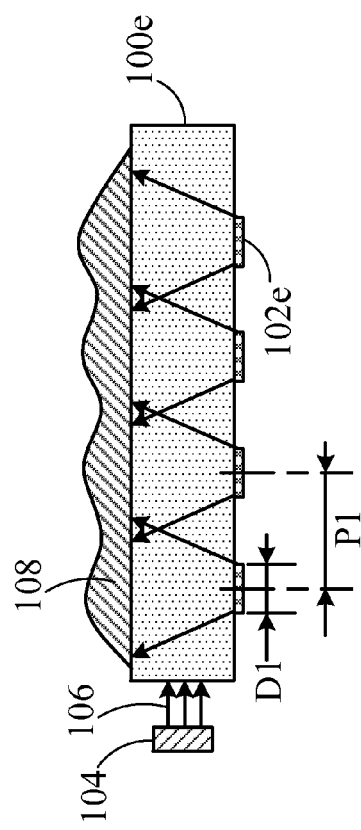

FIGS. 1E and 1F are schematic relationship views of the LGP thickness and mura index (MI) on the light guide plates (LGP) 100e, 100f according to embodiments of the present invention. In FIG. 1E, the light source 104, e.g. light-emitted diode (LED), emits the light beam 106 to the fifth dot pattern 102e disposed under the fifth LGP 100e. The light beam 106 is reflected by the fifth dot pattern 102e and emits through the upper surface of the fifth LGP 100e. Since the geometric shapes and distribution statuses of fifth dot pattern 102e are differently arranged, a region distribution 108 with brightness intensity variation is formed on the upper surface of the fifth LGP 100e. In FIG. 1F, the light source 104, e.g. light-emitted diode (LED), emits the light beam 106 to the sixth dot pattern 102f disposed under the sixth LGP 100f. The light beam 106 is reflected by the sixth dot pattern 102f and emits through the upper surface of the sixth LGP 100f. Since the geometric shapes and distribution statuses of sixth dot pattern 102f are differently arranged, a region distribution 108 with brightness intensity variation is formed on the upper surface of the sixth LGP 100f. When the thickness of the sixth LGP 100f is less than the thickness of the fifth LGP 100e, the sixth LGP 100f with smaller thickness easily results in pattern mura in comparison with the fifth LGP 100e with greater thickness.

Figure 2A:
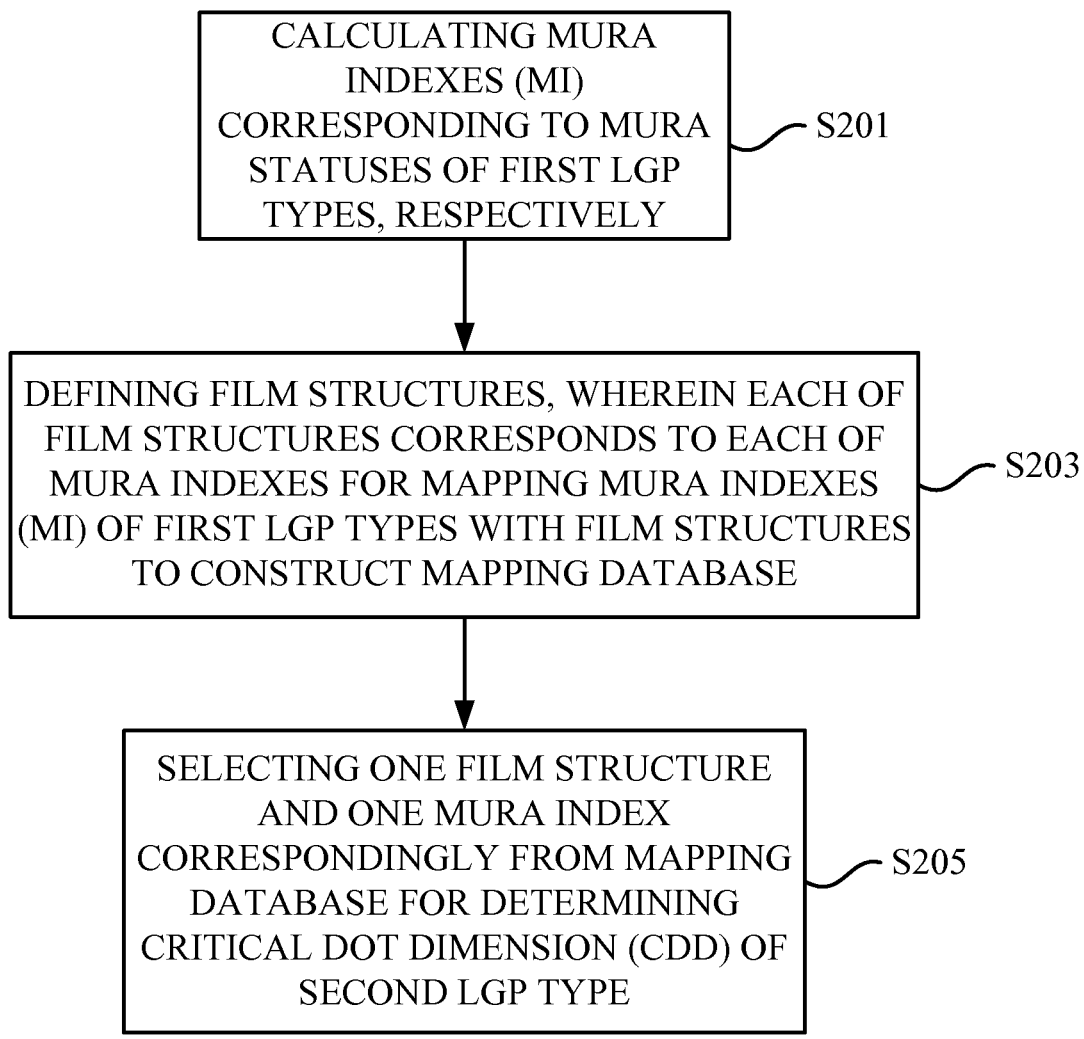
FIG. 2A is a flow chart of selecting method for choosing the LGP according to one embodiment of the present invention.
Figure 2B:
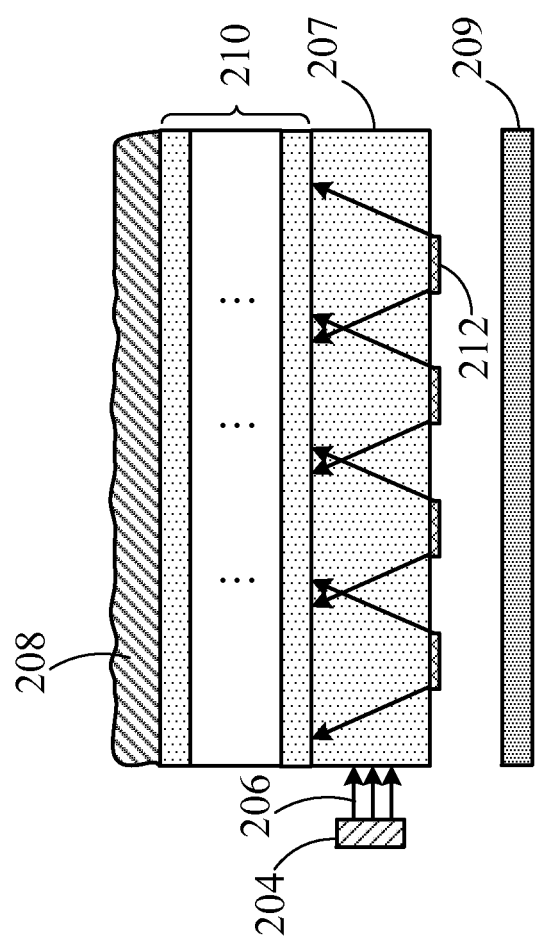
FIG. 2B is a schematic structural view of a backlight module according to one embodiment of the present invention.

Please refer to FIG. 2A and FIG. 2B. FIG. 2A is a flow chart of selecting method for choosing the second LGP type 207 according to one embodiment of the present invention. FIG. 2B is a schematic structural view of a backlight module 200 according to one embodiment of the present invention. The selecting method for choosing the second LGP type 207 is applicable to the backlight module 200 of LCD. The backlight module 200 includes a light source 204, the second LGP type 207, a reflector 209 and a second film structure 210. The light beam 206 is reflected by the critical dot patterns 212 and emits through the upper surface of the second LGP type 207 to form a region distribution 208 with brightness intensity variation. As shown in FIG. 2A, the selecting method for choosing the second LGP type 207 includes the following steps.

In step S201, a plurality of mura indexes (MI) corresponding to a plurality of mura statuses of a plurality of first LGP types respectively are calculated. As shown in FIGS. 1A-1F, each of the first LGP type has a plurality of first dot pattern types and each of the mura indexes is represented by an equation, $MI = D1*T1/(P1*P2)$, and wherein MI represents each of the mura indexes, D1 represents a dimension of each first dot pattern, P1 represents a first interval distance between the first dot patterns and T1 represents a first thickness of the first LGP type. The first LGP includes a first LGP 100a through sixth LGP 100f shown in FIGS. 1A-1F. The first dot pattern types include the first dot pattern 102a through sixth dot pattern 102f. The mura index represents the shielding ability of the film structure to the mura effect and relates to the types or/and models of the material layers forming the film structure. The first dot pattern dimension D1, the first interval distance P1 between the first dot patterns and the first thickness T1 of the first LGP type are related to the first LGP type. On one hand, if the mura index is decreased, the shielding ability of the film structure to the mura effect of the first LGP type is increased. On the other hand, if the mura index is increased, the shielding ability of the film structure to the mura effect of the first LGP type is decreased.

For example, if the thickness is 3 mm, the dot pattern dimension, e.g. diameter, is 0.43 mm and the interval distance between the dot patterns is 1.17 mm, the mura index, 0.94 (calculated by 0.43*3/(1.17*1.17) or less than 0.94, has a shielding ability of the film structure to mura effect to improve the backlight module.

In step S203, a plurality of film structures are defined, wherein each of the film structures corresponds to each of mura indexes for mapping the mura indexes (MI) of the first LGP types with the film structures to construct a mapping database.

In one embodiment of the selecting method, when the selected film structure is composed of two overlapped diffusion plates, the mura index of the selected film structure is determined by a range from 0.44 to 0.66.

In one embodiment of the selecting method, when the selected film structure is composed of a diffusion plate, a brightness enhancement film (BEF) and a micro-lens which are sequentially overlapped, the mura index of the selected film structure is determined by a range from 0.57 to 0.85. The diffusion plate is adjacent to the first LGP and the second LGP type 207.

In one embodiment of the selecting method, when the selected film structure is composed of a first diffusion plate, a brightness enhancement film (BEF) and a second diffusion plate which are sequentially overlapped, the mura index of the selected film structure is determined by a range from 0.71 to 1.07. The first diffusion plate is adjacent to the first LGP and the second LGP type 207.

In one embodiment of the selecting method, when the selected film structure is composed of a diffusion plate, a brightness enhancement film (BEF) and a reflective brightness enhancement film which are sequentially overlapped, the mura index of the selected film structure is determined by a range from 0.68 to 1.02. The diffusion plate is adjacent to the first LGP and the second LGP type 207.

In one embodiment of the selecting method, when the selected film structure is composed of a first brightness enhancement film, a second brightness enhancement film and a diffusion plate which are sequentially overlapped, the mura index of the selected film structure is determined by a range from 0.66 to 0.99. The first brightness enhancement film is adjacent to the first LGP and the second LGP type 207.

In step S205, one of the film structures 210 and one of the mura indexes (MI) correspondingly from the mapping database are selected for determining a critical dot dimension (CDD) 212 of a second LGP type 207 of the selected film structure 210. The second LGP type 207 comprises a plurality of second dot patterns, the critical dot dimension 212 is positively related to the mura index of the selected film structure 210, the critical dot dimension 212 is positively related to a second interval distance P2 formed between the second dot patterns, and the critical dot dimension 212 is inversely related to a second thickness T2 of the second LGP type 207, for selecting the critical dot dimension T2 based on the mura index, the second interval distance P2 and the second thickness T2 of the selected film structure 210. The critical dot dimension (CDD) 212 is represented by an equation, $CDD=MI*(P2*P2)/T2$ wherein MI represents the selected mura index, P2 represents the second interval distance between the second dot patterns and T2 represents the second thickness of the second LGP type 207. In other words, after the film structure 210, the thickness of the second LGP type 207 and the interval distances between the dot patterns are selected, the mura index of the film structure 210 can be inquired for calculating the critical dot dimension (CDD) of the second LGP type 207 so that the mura effect is improved after the second LGP type 207 is assembled with the film structure 210.

In one embodiment of the selecting method, when the mura index of the selected film structure is determined by a range from 0.44 to 0.66 and the CCD of the second LGP type 207 is determined by a range from $0.44*(P2*P2)/T2$ to $0.66*(P2*P2)/T2$.

In one embodiment of the selecting method, when the mura index of the selected film structure is determined by a range from 0.57 to 0.85 and the CCD of the second LGP type 207 is determined by a range from $0.57*(P2*P2)/T2$ to $0.85*(P2*P2)/T2$.

In one embodiment of the selecting method, when the mura index of the selected film structure is determined by a range from 0.71 to 1.07 and the CCD of the second LGP type 207 is determined by a range from $0.71*(P2*P2)/T2$ to $1.07*(P2*P2)/T2$.

In one embodiment of the selecting method, when the mura index of the selected film structure is determined by a range from 0.68 to 1.02 and the CCD of the second LGP type 207 is determined by a range from $0.68*(P2*P2)/T2$ to $1.02*(P2*P2)/T2$.

In one embodiment of the selecting method, when the mura index of the selected film structure is determined by a range from 0.66 to 0.99 and the CCD of the second LGP type 207 is determined by a range from $0.66*(P2*P2)/T2$ to $0.99*(P2*P2)/T2$.

According to the above-mentioned descriptions, the selecting method avoids the mura, speed up the research and development procedure of the backlight module, labor cost and manufacturing cost when the LGP is assembled with the film structure.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A selecting method of a light guide plate (LGP) used in a backlight module of a liquid crystal display (LCD) panel, the selecting method comprising the steps of:

calculating a plurality of mura indexes (MI) corresponding to a plurality of mura statuses of a plurality of first LGP types, respectively, wherein each of the first LGP types has a plurality of first dot patterns and each of the mura indexes is represented by an equation, $MI=D1*T1/(P1*P1)$, and wherein MI represents each of the mura indexes, D1 represents a dimension of each of the first dot patterns, P1 represents a first interval distance between the first dot patterns and T1 represents a first thickness of each of the first LGP types;

defining a plurality of film structures, wherein each of the film structures corresponds to each of mura indexes for mapping the mura indexes (MI) of the first LGP types with the film structures correspondingly to construct a mapping database; and selecting one of the film structures and one of the mura indexes (MI) correspondingly from the mapping database for determining a critical dot dimension (CDD) of a second LGP type of the selected film structure, wherein the second LGP type comprises a plurality of second dot patterns, the critical dot dimension is positively related to the mura index of the selected film structure, the critical dot dimension is positively related to a second interval distance formed between the second dot patterns, and the critical dot dimension is inversely related to a second thickness of the second LGP type, for selecting the critical dot dimension based on the mura index of the selected film structure, the second interval distance and the second thickness of the selected film structure.

2. The selecting method of claim 1, wherein the critical dot dimension (CDD) is represented by an equation, $CDD=MI*(P2*P2)/T2$, and wherein MI represents the selected mura index, P2 represents the second interval distance between the second dot patterns and T2 represents the second thickness of the second LGP type.

3. The selecting method of claim 1, wherein when the selected film structure is composed of two overlapped diffusion plates, the mura index of the selected film structure is determined by a range from 0.44 to 0.66 and the CCD of the second LGP type is determined by a range from $0.44*(P2*P2)/T2$ to $0.66*(P2*P2)/T2$, and wherein P2 represents the second interval distance between the second dot patterns and T2 represents the second thickness of the second LGP type.

4. The selecting method of claim 1, wherein when the selected film structure is composed of a diffusion plate, a brightness enhancement film (BEF) and a micro-lens which are sequentially overlapped, the mura index of the selected film structure is determined by a range from 0.57 to 0.85 and the CCD of the second LGP type is determined by a range from $0.57*(P2*P2)/T2$ to $0.85*(P2*P2)/T2$, wherein P2 represents the second interval distance between the second dot patterns and T2 represents the second thickness of the second LGP type, and wherein the diffusion plate is adjacent to the first LGP type and the second LGP type.

5. The selecting method of claim 1, wherein when the selected film structure is composed of a first diffusion plate, a brightness enhancement film (BEF) and a second diffusion plate which are sequentially overlapped, the mura index of the selected film structure is determined by a range from 0.71 to 1.07 and the CCD of the second LGP type is determined by a range from $0.71*(P2*P2)/T2$ to $1.07*(P2*P2)/T2$, wherein P2 represents the second interval distance between the second dot patterns and T2 represents the second thickness of the second LGP type, and wherein the first diffusion plate is adjacent to the first LGP type and the second LGP type.

6. The selecting method of claim 1, wherein when the selected film structure is composed of a diffusion plate, a brightness enhancement film (BEF) and a reflective brightness enhancement film which are sequentially overlapped, the mura index of the selected film structure is determined by a range from 0.68 to 1.02 and the CCD of the second LGP type is determined by a range from $0.68*(P2*P2)/T2$ to $1.02*(P2*P2)/T2$, wherein P2 represents the second interval distance between the second dot patterns and T2 represents the second thickness of the second LGP type, and wherein the diffusion plate is adjacent to the first LGP type and the second LGP type.

7. The selecting method of claim 1, wherein when the selected film structure is composed of a first brightness enhancement film, a second brightness enhancement film and a diffusion plate which are sequentially overlapped, the mura index of the selected film structure is determined by a range from 0.66 to 0.99 and the CCD of the second LGP type is determined by a range from $0.66*(P2*P2)/T2$ to $0.99*(P2*P2)/T2$, and wherein P2 represents the second interval distance between the second dot patterns and T2 represents the second thickness of the second LGP type, and wherein the first brightness enhancement film is adjacent to the first LGP type and the second LGP type.

* * * * *